US009642028B2

(12) United States Patent
Koskinen et al.

(10) Patent No.: US 9,642,028 B2
(45) Date of Patent: May 2, 2017

(54) TESTING OF LOCATION INFORMATION SIGNALING RELATED TO MINIMIZATION OF DRIVE TESTS AND CONFORMANCE TESTS

(71) Applicant: Nokia Corporation, Espoo (FI)

(72) Inventors: Jussi-Pekka Koskinen, Oulu (FI); Jarkko Koskela, Oulu (FI); Esa Fredriksson, Espoo (FI)

(73) Assignee: Nokia Technologies Oy, Espoo (FI)

( * ) Notice: Subject to any disclaimer, the term of this patent is extended or adjusted under 35 U.S.C. 154(b) by 9 days.

(21) Appl. No.: 14/374,165

(22) PCT Filed: Jan. 11, 2013

(86) PCT No.: PCT/FI2013/050022
§ 371 (c)(1),
(2) Date: Jul. 23, 2014

(87) PCT Pub. No.: WO2013/110849
PCT Pub. Date: Aug. 1, 2013

(65) Prior Publication Data
US 2014/0357298 A1 Dec. 4, 2014

Related U.S. Application Data

(60) Provisional application No. 61/591,759, filed on Jan. 27, 2012, provisional application No. 61/653,345, filed on May 30, 2012.

(51) Int. Cl.
H04W 24/00 (2009.01)
H04W 24/10 (2009.01)
(Continued)

(52) U.S. Cl.
CPC ........... H04W 24/10 (2013.01); G01S 5/0027 (2013.01); H04W 64/00 (2013.01); H04W 24/08 (2013.01); H04W 64/006 (2013.01)

(58) Field of Classification Search
CPC ............................................. H04W 4/02–4/06
(Continued)

(56) References Cited

U.S. PATENT DOCUMENTS 6,611,688 B1 * 8/2003 Raith ...................... H04W 4/02
340/992
2004/0097237 A1 * 5/2004 Aoyama ............... H04W 24/00
455/445

(Continued)

FOREIGN PATENT DOCUMENTS

EP 2139194 A2 12/2009
EP 2360962 A2 8/2011
(Continued)

OTHER PUBLICATIONS

3GPP TS 34.109, "3rd Generation Partnership Project; Technical Specification Group Radio Access Network; Terminal logical test interface; Special conformance testing functions", Release 10, v10.1.0, Dec. 2011.

(Continued)

Primary Examiner — San Htun
(74) Attorney, Agent, or Firm — Mintz Levin Cohn Ferris Glovsky and Popeo, P.C.

(57) ABSTRACT

Methods and apparatus, including computer program products, are provided for testing of wireless devices. In one aspect there is provided a method. The method may include receiving, at a user equipment, location information provided by a network node (306); generating, by the user equipment, a report including at least one measurement and the received location information linked to the at least one measurement; and sending, by the user equipment, the report to the network node, the report including the at least one (Continued)

measurement and the received location information (320). Related apparatus, systems, methods, and articles are also described.

26 Claims, 6 Drawing Sheets

(51) Int. Cl.
*H04W 64/00* (2009.01)
*G01S 5/00* (2006.01)
*H04W 24/08* (2009.01)

(58) Field of Classification Search
USPC .......... 455/423–425, 456.1–457; 370/310.2, 370/328, 338, 332, 333
See application file for complete search history.

(56) References Cited

U.S. PATENT DOCUMENTS

| | | | |
|---|---|---|---|
| 2011/0183661 A1* | 7/2011 | Yi | H04W 24/10 455/422.1 |
| 2011/0250880 A1 | 10/2011 | Olsson | |
| 2011/0250910 A1 | 10/2011 | Lee et al. | |
| 2012/0082051 A1* | 4/2012 | Kim | H04W 24/10 370/252 |
| 2012/0113837 A1* | 5/2012 | Siomina | H04W 24/10 370/252 |
| 2012/0295650 A1* | 11/2012 | Futaki | H04W 52/0216 455/507 |
| 2013/0115970 A1* | 5/2013 | Hapsari | H04W 24/02 455/456.1 |

FOREIGN PATENT DOCUMENTS

| | | | |
|---|---|---|---|
| GB | 2479468 A | 10/2011 | |
| JP | 2010010911 A | 1/2010 | |
| RU | 2328016 C2 | 6/2008 | |
| WO | WO-2008053316 A2 | 5/2008 | |
| WO | WO-2011126014 A1 | 10/2011 | |
| WO | WO 2011136208 A1 * | 11/2011 | ............ H04W 24/10 |
| WO | WO-2011136208 A1 | 11/2011 | |
| WO | WO-2011137108 A1 | 11/2011 | |

OTHER PUBLICATIONS

3GPP TS 37.320, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2, Release 10, V10.4.0, Dec. 2011.
3GPP TS 36.331, "3rd Generation Partnership Project; Technical Specification Group Radio Access network; Evolved Universal Terrestrial Radio Access (E-UTRA); Radio Resource Control (RRC); Protocol specification", Release 10, V10.4.0, Dec. 2011.
3GPP TS 36.355, 3rd Generation Partnership Project; Technical Specification Group Radio Access Network; Evolved Universal Terrestrial Radio Access (E-UTRA); LTE Positioning Protocol (LPP), Release 10, V10.4.0, Dec. 2011.
3GPP TS 36.509, 3rd Generation Partnership Project; Technical Specification Group Radio Access Network; Evolved Universal Terrestrial Radio Access (E-UTRA) and Evolved Packet Core (EPC); Special conformance testing functions for User Equipment (UE), Release 9, V9.5.0, Sep. 2011.
3GPP TS 36.508, "3rd Generation Partnership Project; Technical Specification Group Radio Access Network; Evolved Universal Terrestrial Radio Access (E-UTRA) and Evolved Packet Core (EPC); Common test environments for User Equipment (UE) conformance testing", Release 9, V9.7.0, Dec. 2011.
3GPP TS 36.201, 3rd Generation Partnership Project; Technical Specification Group Radio Access Network; Evolved Universal Terrestrial Radio Access (E-UTRA); LTE physical layer, General description, Release 10, V10.0.0, Dec. 2010.
3GPP TS 36.211, "3rd Generation Partnership Project; Technical Specification Group Radio Access Network; Evolved Universal Terrestrial Radio Access (E-UTRA); Physical Channels and Modulation", Release 10, v10.4.0, Dec. 2011.
3GPP TS 36.212, "3rd Generation Partnership Project; Technical Specification Group Radio Access Network; Evolved Universal Terrestrial Radio Access (E-UTRA); Multiplexing and channel coding", Release 10, v10.4.0, Dec. 2011.
3GPP TS 36.213, "3rd Generation Partnership Project; Technical Specification Group Radio Access Network; Evolved Universal Terrestrial Radio Access (E-UTRA); Physical layer procedures", Release 10, v10.4.0, Dec. 2011.
3GPP TS 36.214, 3rd Generation Partnership Project; Technical Specification Group Radio Access Network; Evolved Universal Terrestrial Radio Access (E-UTRA); Physical layer; Measurements, Release 10, v10.2.0, Mar. 2011.
3GPP TS 36.423, 3rd Generation Partnership Project; Technical Specification Group Radio Access Network; Evolved Universal Terrestrial Radio Access Network (E-UTRAN); X2 application protocol (X2AP), Release 10, v10.4.0, Dec. 2011.
3GPP TS 36.523-3, "3rd Generation Partnership Project; Technical Specification Group Radio Access Network; Evolved Universal Terrestrial Radio Access (E-UTRA), and Evolved Packet Core (EPC); User Equipment (UE) conformance specification Part 3: Test Suites", Release 9, v9.2.0, Dec. 2011.
3GPP TS 34.123-3, 3rd Generation Partnership Project; Technical Specification Group Radio Access Network; User Equipment (UE) conformance specification; Part 3: Abstract Test Suite (ATS), Release 9, v9.2.0, Dec. 2011.
3GPP TS 27.007, "3rd Generation Partnership Project; Technical Specification Group Core Network and Terminals; AT command set for User Equipment (UE)", Release 11, v11.1.0, Dec. 2011.
IEEE Std. 802.16, IEEE Computer Society and the IEEE Microwave Theory and Techniques Society, May 6, 2011.
3GPP TS 25.331, 3rd Generation Partnership Project; Technical Specification Group Radio Access Network; Radio Resource Control (RRC); Protocol specification, Release 10, V10.4.0, Jun. 2011.
International Search Report dated May 8, 2013, for PCT application No. PCT/FI2013/050022.
NTT Docomo, Inc. "3GPP TSG-RAN2#70bis (R2-103872): Positioning session as trigger for MDT measurement collection". Agenda Item 4.3.1.3 (4.3.1.2). Jun. 28-Jul. 2, 2010. Stockholm, Sweden. <Downloaded Oct. 13, 2015>.
NTT Docomo, Inc., MediaTek, Vodafone, CMCC. "3GPP TSG-RAN2#76 (R2-116135): Requirements, Priority and Solution for MDT Location Information Enhancement". Agenda Item 5.2.2. Nov. 14-18, 2011. San Francisco, USA. <Downloaded Oct. 13, 2015>.
Intel Corporation. "3GPP TSG RAN WG2 Meeting #76 (R2-116283): Positioning Enhancements for MDT" Agenda Item 5.2.2. San Francisco, USA. <Downloaded Oct. 13, 2015>.
Samsung. "3GPP TSG-RAN2#71 bis meeting (R2-105497): Miscellaneous MDT related stage 3 issues". Agenda Item 4.3.1.6. Oct. 11-15, 2010. Xi'an, P.R. China. <Downloaded Oct. 13, 2015>.

* cited by examiner

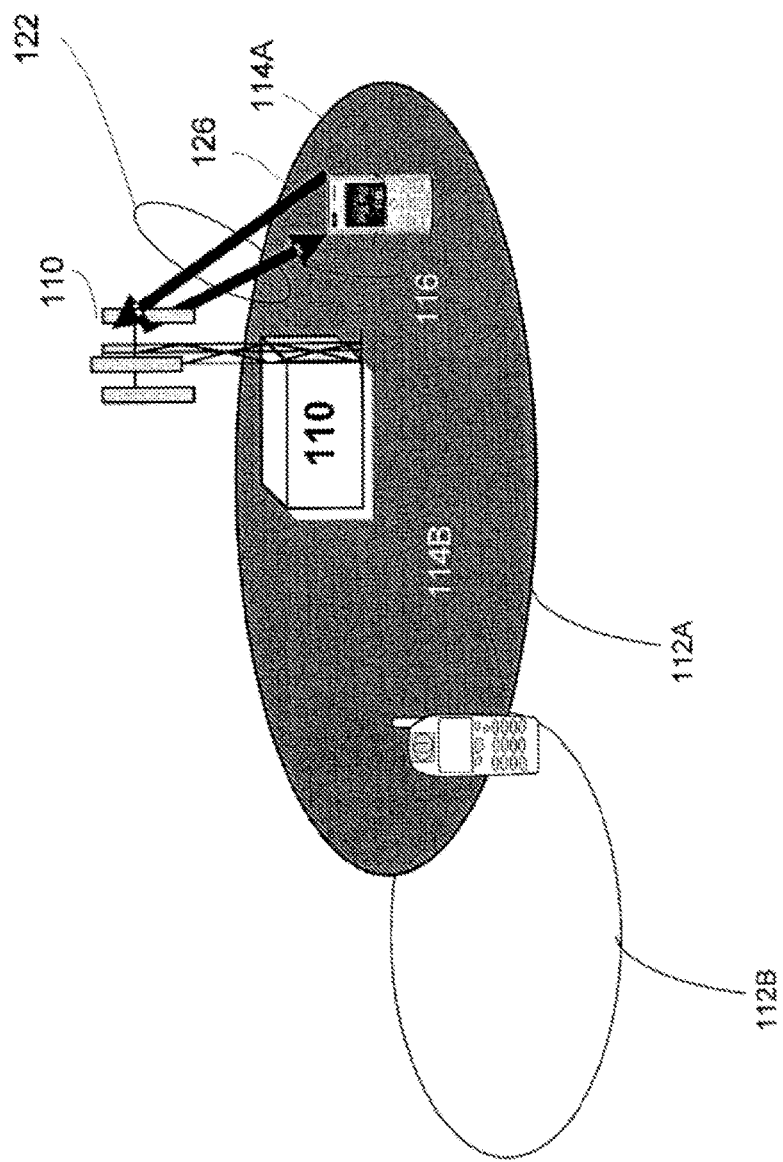

TESTING OF LOCATION INFORMATION SIGNALING RELATED TO MINIMIZATION OF DRIVE TESTS AND CONFORMANCE TESTS

CROSS-REFERENCE TO RELATED APPLICATION

This application is a national stage application, filed under 35 U.S.C. §371, of PCT Application No. PCT/FI2013/050022, filed on Jan. 11, 2013, which claims priority to U.S. Provisional Application No. 61/591,759 filed on Jan. 27, 2012, and 61/653,345 filed on May 30, 2012, the contents of which are incorporated herein by reference in their entirety for all purposes.

FIELD

The subject matter described herein relates to wireless communications.

BACKGROUND

Wireless service providers test their networks to identify coverage holes (also referred to as dead zones) or weak coverage areas in their networks. The drive test is a manual process that literally includes driving in a vehicle to collect power, location, and other measurements to build coverage maps and identify potential coverage holes or other issues in the radio network. Once a service provider identifies a coverage hole, the service provider may attempt to enhance existing coverage to address the hole by, for example, adding a base station, increasing power, changing the orientation of base station antennas, and the like.

In addition to drive tests, wireless equipment is typically tested to ensure that the equipment conforms to specifications. Once tested, the equipment is "certified" as being compliant with a standard, such as WiFi, LTE, and the like. For example, a simulator may be used to simulate a network and base station, and the simulator may test the wireless equipment, which may be located in an RF shield room to ensure that the wireless device complies to the standard being tested (e.g., conforms to air interface specifications and the like).

SUMMARY

Methods and apparatus, including computer program products, are provided for minimization of drive testing and/or conformance testing.

In some exemplary embodiments, there may be provided a method. The method may include receiving, at a user equipment, location information provided by a network node; generating, by the user equipment, a report including at least one measurement and the received location information linked to the at least one measurement; and sending, by the user equipment, the report to the network node, the report including the at least one measurement and the received location information.

In some exemplary embodiments, there may be provided another method. The method may include sending, by a network node, location information to a user equipment, the location information sent to enable the user equipment to perform at least one of a minimization of drive testing and a conformance test; and receiving, at the network node, the at least one measurement made at the user equipment, the at least one measurement linked to the location information representative of where the user equipment made the at least one measurement.

In some variations of some of the embodiments disclosed herein, one or more of the following may be included. The network node may include a system simulator configured to perform conformance testing of the user equipment. The network node may include a base station configured to perform minimization of drive testing. The location information may be linked to the at least one measurement comprising the at least one measurement made by the user equipment and the location information further comprises an information element including a velocity associated with the user equipment making the at least one measurement, a time associated with the user equipment making the at least one measurement, and a geographic position associated with the user equipment making the at least one measurement. The location information may include an ellipsoid point, an ellipsoid point with altitude, and a time of day, and a horizontal velocity. The location information may be received in one or more radio resource control messages. The location information may be received in at least one of a test control message, a machine-to-machine interface command, or an attention command sent by a system simulator over an air interface. The location information may be received, when a tracking area update (TAU) is performed. The location information may be received from a broadcast channel coupling the network node and the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 1B depicts a block diagram of a wireless communication system, in accordance with some exemplary embodiments;

Figure 1A:
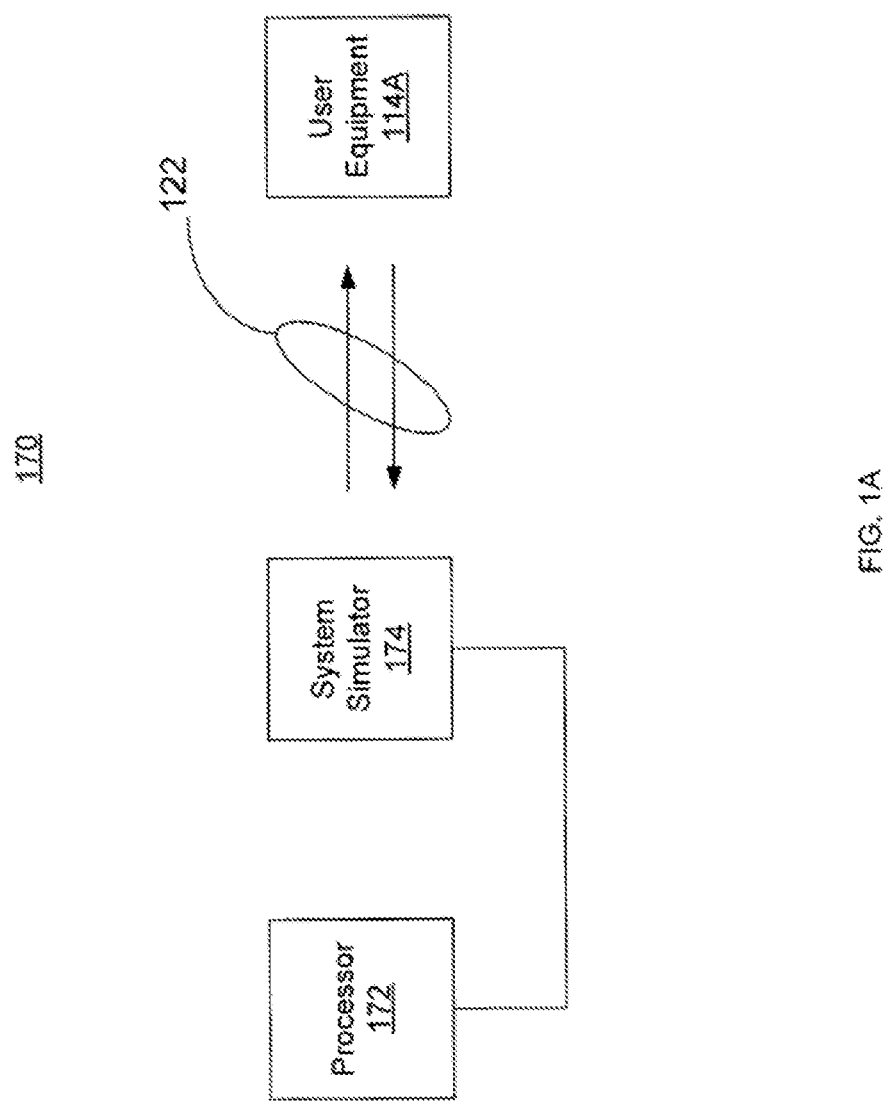
FIG. 1A depicts an example of a system simulator, in accordance with some exemplary embodiments.

Like labels are used to refer to same or similar items in the drawings.

DETAILED DESCRIPTION

The subject matter described herein relates to testing and, in particular, certification testing of wireless equipment and minimization of drive tests (MDT) in cellular networks.

Operators have typically performed manual testing and verification of cellular radio networks by performing drive testing which includes specific measurements to collect data and to verify the operation of the network. Minimization of drive testing (MDT) may, however, provide a framework, which includes numerous standards seeking to overcome the costs and environmental impact related to traditional, manual drive testing. Instead of manual drive testing, the network and/or the user equipment collect measurements to allow MDT and thus perform testing of the network, such as network coverage, capacity optimization, optimization of mobility parameters, and the like. Indeed, numerous standards have been specified to provide a framework for MDT.

Examples of standards which can be used in testing user equipment include: (1) 3GPP TS 34.109, V10.1.0 (2011-12), Technical Specification: 3rd Generation Partnership Project; Technical Specification Group Radio Access Network; Terminal logical test interface; Special conformance testing functions (Release 10); (2) 3GPP TS 37.320, V10.4.0 (2011-12), Technical Specification: 3rd Generation Partnership Project; Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10); (3) 3GPP TS 36.331, V10.4.0 (2011-12), Technical Specification: 3rd Generation Partnership Project; Technical Specification Group Radio Access Network; Evolved Universal Terrestrial Radio Access (E-UTRA); Radio Resource Control (RRC); Protocol specification (Release 10), (4) 3GPP TS 36.355, V10.4.0 (2011-12), Technical Specification: 3rd Generation Partnership Project; Technical Specification Group Radio Access Network; Evolved Universal Terrestrial Radio Access (E-UTRA); LTE Positioning Protocol (LPP) (Release 10); (5) 3GPP TS 36.509, V9.5.0 (2011-09), Technical Specification: 3rd Generation Partnership Project; Technical Specification Group Radio Access Network; Evolved Universal Terrestrial Radio Access (E-UTRA) and Evolved Packet Core (EPC); Special conformance testing functions for User Equipment (UE) (Release 9); (6) 3GPP TS 36.508, V9.7.0 (2011-12), Technical Specification: 3rd Generation Partnership Project; Technical Specification Group Radio Access Network; Evolved Universal Terrestrial Radio Access (E-UTRA) and Evolved Packet Core (EPC); Common test environments for User Equipment (UE) conformance testing (Release 9); and any additions and revisions to these and other standards.

MDT may operate via control plane extensions. For example, MDT measurements may be made at a user equipment, and the measurements may be reported to the network (as, e.g., MDT reports). The user equipment may send the MDT reports to the network via an uplink channel, such as via radio resource control (RRC) signaling between the user equipment and the network. The network may comprise a network node, such as a base station, a system simulator, a base station simulator, and/or any other test mechanisms.

In some exemplary embodiments, the network node may comprise a system simulator, as noted. The system simulator may be used for conformance testing (also known as certification testing), without introducing GPS signaling into the commercial conformance testing environment to allow the user equipment to be conformance tested. Indeed, some of the exemplary embodiments described herein may also be used with conformance testing of MDT and/or other features including location information. Furthermore, conformance testing, like MDT, may include making measurements at the user equipment. As such, a manufacturer of user equipment may need to show that the user equipment passes certain tests, as specified by standards, certification criteria, and the like, to achieve certification for use on certain wireless mobile networks. Testing, such as conformance testing, may also be performed in a laboratory (e.g., in a radio frequency shield room), so that the system simulator can simulate the network or a portion thereof and accurately test the user equipment.

FIG. 1A depicts an example of a system 170 consistent with some exemplary embodiments. The system 170 includes a processor 172 coupled via a link 176 to a system simulator 174, which is further coupled via an air interface, such as links 122, to a user equipment 114A.

In the example of FIG. 1A, the processor 172 may be implemented as a computer to control the system simulator 174, which simulates the wireless network including one or more protocols of the network. The processor 172 may also log conformance test results and generate test data/sequences. In some exemplary embodiments, the processor 172 may store and execute test scripts, which control the simulator 174 during the testing of user equipment 114A. For example, a test script generator may be configured to generate a test script (e.g., testing and test control notation version 3 (TTCN-3) script), store the test script, and execute the test script to initiate and/or conduct conformance testing of the user equipment 114A, certifying thus the operability of the user equipment 114A with a wireless network. Moreover, the system simulator 174 may be configured to provide location information via an air interface, such as at least one of links 122, to user equipment 114A to allow user equipment 114A to perform conformance testing using the location information, without requiring the user equipment 114A to access location information from location-based processors at user equipment 114A.

Referring again to MDT, the MDT reports from the user equipment to the network may be immediate, when the user equipment is in an active, or connected, mode. This immediate reporting corresponds to the normal reporting expectations for radio resource management (RRM). The MDT reports sent by the user equipment to the network may be triggered by an event, such as a handover, cell change, and the like, and/or by a request.

In the case of MDT reporting when the user equipment is in an idle mode, in which case immediate MDT reporting is not possible, the user equipment may record (also referred to as log) MDT measurements made by the user equipment and wait until a connection is available between the user equipment and the network in order to send the MDT report. In any case, the network may receive one or more MDT reports to assess the performance of the network, such as network coverage, capacity optimization, optimization of mobility parameters, and the like.

In some exemplary embodiments, there may be two different modes for MDT measurement and reporting. The two modes are referred to herein as immediate MDT and logged MDT.

In the case of immediate MDT, the user equipment and network may be configured with a connection. For example, the user equipment and the network, such as a base station, may establish a connection over which control signaling, such as RRC control messages may be exchanged. Moreover, in some exemplary embodiments, the control signaling between the user equipment and the base station may be extended to request and/or report the location of the user equipment. Furthermore, the MDT measurement data that is reported as part of the MDT reporting may, in some exemplary embodiments, be extended to include location information defining the geographic location of the user equipment, the velocity of the user equipment making the measurements, and the time of day associated with the measurements.

In the second mode, logged MDT, the user equipment performs MDT measurements when the user equipment is in an idle mode, and the recorded measurements are logged and later reported to the network in MDT reports, when a connection is established between the user equipment and the network. In the logged MDT case, the MDT measurement data that is reported as part of the MDT reporting may, in some exemplary embodiments, be extended to include location information defining the geographic location of the user equipment, time information, speed information, and the like (see, e.g., Table 1). The IE LocationInfo may be used to transfer detailed location information available at the user equipment to correlate measurements and UE position information (e.g., each measurement is linked to the user equipment's position when detailed location information is available in the user equipment).

Although some of the examples described herein refer to GPS and GNSS, the location information is not limited to these systems as other sources of location information may be used as well.

In some exemplary embodiments, the network (and/or, e.g., the system simulator) may thus provide location information to the user equipment, where the location information is stored for use later when reporting to the network test measurements, such as MDT reports, conformance tests, and the like. In addition, when the user equipment is ready to send test measurements, the user equipment may report the test measurements and link (e.g., associate) location information representative of the user equipment's location where the test measurement was made (which was provided by the network rather than determined directly by the user equipment). The location information may, as noted, further include the velocity associated with the user equipment making the measurement and the time associate with the user equipment.

The network (and/or system simulator) may receive the test measurements, such as an MDT report(s) and the like, and analyze the test measurements including the linked detailed location information provided with the test measurements to assess the performance of the network and/or the user equipment. In addition, the system simulator may verify that the user equipment sends the correct MDT measurements linked to the correct location information.

The location information provided by the network (and/or system simulator) to the user equipment to facilitate MDT reporting may, in some exemplary embodiments, be used to locate geographic areas (and/or time so that network is able to determine when the measurement was made, the speed of the user equipment, and the like) in the network as reported by user equipment configured for MDT reporting. For example, the areas may represent a geographic area under test by the network and, as such, the user equipment provides MDT reports when in that area. In any case, the user equipment may extend the MDT reports with the location information.

In addition, the location information provided by the network (and/or system simulator) to the user equipment and/or reported by the user equipment to the network may be configured, in some exemplary embodiments, as an information element for location information ("IE LocationInfo") as depicted in Table 1 below, although other formats may be used as well. For example, the user equipment may send an MDT report including the IE LocationInfo information element depicted at Table 1 to the network to allow the network to correlate location information from one or more MDT reports. The location information of Table 1 may also be provided to the user equipment using a special testing function. For example, when performing conformance testing, Test Control (TC) protocol messages may be used by the system simulator 174 to send to the user equipment 114A the detailed location information of Table 1.

TABLE 1

```
-- ASN1START
LocationInfo-r10 ::= SEQUENCE {
    locationCoordinates-r10            CHOICE {
        ellipsoid-Point-r10                OCTET STRING,
        ellipsoidPointWithAltitude-r10     OCTET STRING,
        ...
    },
    horizontalVelocity-r10             OCTET STRING OPTIONAL,
    gnss-TOD-msec-r10                  OCTET STRING OPTIONAL,
    ...
}
-- ASN1STOP
```

At Table 1, the ellipsoid-Point and ellipsoidPointWithAltitude represent location information, and, in particular, geographic shape information. The horizontalVelocity represents location information, and, in particular, velocity shape information. The gnss-TOD-msec represents time of day for which the measurements and/or location estimates are valid. Moreover, in some implementations, the ellipsoid-Point, ellipsoidPointWithAltitude, gnss-TOD-msec, and horizontalVelocity may be configured in accordance with 3GPP TS 36.355.

In some exemplary embodiments, the user equipment may receive location information from the network (and/or system simulator), store the location information at the user equipment (e.g., which may be stored in accordance with TS 36.331), and, when reporting measurements (e.g., MDT information and the like), include the location information in the measurements sent to network (and/or system simulator). For example, the user equipment may include the location information in MDT reporting messages, such as UEInformationResponse and MeasurementReport messages, sent to the network. As such, the user equipment may provide detailed, GNSS, location information to the network as part of the MDT reporting, without requiring the MDT controller at the user equipment to access GPS signals at GPS processors at the user equipment itself.

In some exemplary embodiments, when the user equipment is connected to the network, such as when the user equipment is in an RRC_CONNECTED state, the user equipment may use one or more specific channels to receive the location information from the network, and subsequently report such location information along with one or more of the MDT reports.

However, in some exemplary embodiments, the user equipment may be in an idle mode, such as an RRC_IDLE mode. When this is the case, the user equipment may store (also referred to as log) any MDT measurements as there are no available channels to send MDT reports including the location information. As there are no user equipment specific channels available to the network, the user equipment may have to wait to report the MDT measurements and the location information. Moreover, as there are no user equipment specific channels to (or from) the network, the network may not be able to provide location information, such as the information at Table 1, to the user equipment. When this is the case, the network may provide, in some exemplary embodiments, location information, such as the information at Table 1, to the user equipment, whenever a tracking area update (TAU) is performed. And, in some exemplary embodiments, each cell may be placed in a different tracking area to ensure frequent TAUs. When a TAU is performed, the user equipment enters a RRC_CONNECTED state to perform the TAU. Accordingly, the RRC_CONNECTED state allows the location information to be sent to the user equipment during the connection established for the RRC_CONNECTED state. The user equipment may then use this location information when it enters into a subsequent idle mode after the TAU is performed (and the connection is released).

Furthermore, location information, such as the information at Table 1, may be provided from the network to the user equipment using an additional broadcast channel between the network and user equipment (or utilize an existing broadcast channel, such as a broadcast control channel (BCCH) or paging control channel (PCCH)). The additional broadcast channel may, in some exemplary embodiments, be configured as a test control channel (TCCH) having its own defined radio network temporary identifier (RNTI), which may be sent using, for example, the same or similar periodicities as a paging channel.

Before providing additional details, an exemplary system environment 100 is described in connection with FIG. 1B. In some exemplary embodiments, the wireless communication system 100 may include a base station 110 supporting corresponding service or coverage areas 112A-B (also referred to as cells). The base station 110 may be capable of communicating with wireless devices, such as user equipment 114A-B, within its coverage areas. FIG. 1B also depicts that user equipment 114B may also be in another coverage area 112B, which may be served by another base station as well.

Although FIG. 1B depicts a single base station 110, two cells 112A-B, and two-user equipment 114A-B, the wireless communication system 100 may include other quantities of base stations, cells, and user equipment as well. Moreover, in some embodiments in which system simulator 172 is used, the system simulator 172 may be used to simulate one or more aspects of system 100 including the base station 110.

In some exemplary embodiments, the base station 110 may include a system simulator, a base station simulator, and/or any other mechanism for controlling and/or conducting testing with one or more user equipment.

Moreover, the base station 110 may, in some exemplary embodiments, be implemented as an evolved Node B (eNB) type base station consistent with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

Furthermore, the base station 110 and/or system simulator 174 may, in some exemplary embodiments, include test mechanisms (e.g., the system simulator, the base station simulator, and the like) configured in accordance with one or more of the following standards: 3GPP TS 34.109, 3GPP TS 37.320, 3GPP TS 36.331, 3GPP TS 36.355, 3GPP TS 36.509, 3GPP TS 36.508, and any subsequent additions or revisions to these and other 3GPP series of standards.

Although FIG. 1B depicts an example of a configuration for base station 110, the base station 110 may be configured in other ways including, for example, relays, cellular base station transceiver subsystems, gateways, access points, radio frequency (RF) repeaters, frame repeaters, nodes, and include access to other networks as well. For example, base station 110 may have wired and/or wireless backhaul links to other network elements, such as other base stations, a radio network controller, a core network, a serving gateway, a mobility management entity, a serving GPRS (general packet radio service) support node, a network management system, and the like.

In some exemplary embodiments, the wireless communication system 100 may include access links, such as links 122. The access links 122 include a downlink 116 for transmitting to the user equipment 114A and an uplink 126 for transmitting from user equipment 114A to the base station 110. The downlink 116 may comprise a modulated radio frequency carrying information, such as RRC messages, location information, and the like, to the user equipment 114A, and the uplink 126 may comprise a modulated radio frequency carrying information, such as RRC messages, location information, and the like, from the user equipment 114A to base station 110.

In some exemplary embodiments, the user equipment 114A-B may be implemented as a mobile device and/or a stationary device. The user equipment 114A-B are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (e.g., memory, storage, and the like), a radio access mechanism, and/or a user interface. For example, the user equipment may take the form of a wireless telephone, a computer with a wireless connection to a network, or the like.

The downlink 116 and uplink 126 may, in some exemplary embodiments, each represent a radio frequency (RF) signal. The RF signal may, as noted above, include data, such as voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards and specifications.

Figure 2:
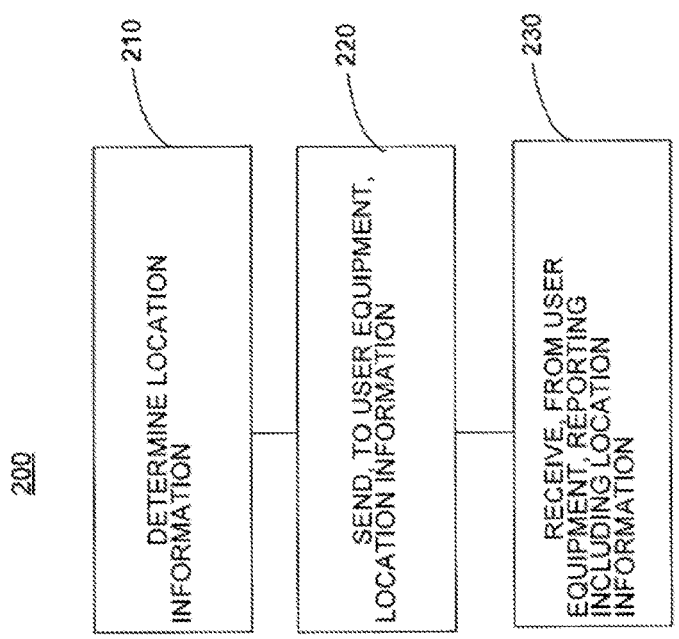
FIG. 2 depict a process in which the network provides the user equipment with location information to enable reporting including detailed location information, in accordance with some exemplary embodiments.

FIG. 2 depicts a process 200 for testing using location information provided by the network (e.g., a base station, a network node, a system simulator, and the like) to the user equipment to facilitate testing and reporting by the user equipment, in accordance with some exemplary embodiments.

In some exemplary embodiments, location information may be determined at 210. For example, location information may be determined at the network, such as a network node, the system simulator 174, and/or the base station 110. Moreover, the location information may include detailed, location information (e.g., GNSS information), and, in some exemplary embodiments, may be configured as information elements, such as the information element depicted at Table 1. In addition, the location information may represent a geographic location in the network, such a location within cell 112A or the location of user equipment 114A. The location information may also include velocity information and/or time of day information.

In some exemplary embodiments, the location information may, at 220, be sent to the user equipment. For example, the network may send via downlink 116 to user equipment 114A the location information determined at 210. The network may send the location information using, for example, control plane signaling, such as RRC messages, or in the embodiments using system simulator 174, the location information may be sent via test control (TC) messages (although other types of messages, such as machine-to-machine interface commands or attention commands may be used as well). Moreover, the network may provide, in some exemplary embodiments, location information, such as the information at Table 1, to the user equipment, whenever a tracking area update (TAU) is performed, as noted above. Furthermore, the location information, such as the information at Table 1, may also be provided to the user equipment using an additional broadcast channel between the network and user equipment and/or using an existing broadcast channel (e.g., a BCCH or PCCH), as noted above. Once received, the user equipment may store the location information until the user equipment is ready to report the measurements to the network and/or system simulator. For example, when there is an event, such as a radio link failure, handover indication, or any other event, the user equipment may be triggered to send the measurements (e.g., as an MDT report or any reporting) including the location information to the network and/or system simulator.

Although the previous example described using test control messages to provide location information, other types of methods may be used as well. For example, machine-to-machine interface (MMI) commands (which may be compatible with 3GPP TS 36.423.3, 3GPP TS 36.523-3, and/or 3GPP TS 34.123-3) may be used to control user equipment functions and to provide location information. Table 2 depicts an example of the MMI commands which may be used to control and/or provide location information. For example, the commands at Table 1 may be extended to include the location information described above (e.g., with respect to Table 1 and the like).

TABLE 2

MMI commands

| Command | Parameters | |
|---|---|---|
| | Name | Value |
| "SWITCH_ON" | | (none) |
| "SWITCH_OFF" | | (none) |
| "POWER_ON" | | (none) |
| "POWER_OFF" | | (none) |

TABLE 2-continued

MMI commands

| Command | Parameters | |
|---|---|---|
| | Name | Value |
| "INSERT USIM" | "USIM" | <USIM> |
| "REMOVE_USIM" | | (none) |
| "CHECK_PLMN" | "PLMN" | <PLMN ID> |
| "CHECK_ETWS_INDICATION" | "WARNING1" | <WARNING1> |
| | "WARNING2" | <WARNING2> |
| "CHECK_ETWS_ALERT" | | (none) |
| "CHECK_SMS_LENGTH_CONTENTS" | "Length" | <Length> |
| | "Msg" | <Msg> |
| "DISABLE EPS CAPABILITY" | | (none) |
| DETACH_NON_EPS | | (none) |
| CLEAR_STORED_ASSISTANCE_DATA | | (none) |
| CHECK_DTCH_THROUGHCONNECTED | | (none) |
| GERAN_UPLINK_DATA | | (none) |
| "SELECT_CSG" | "PLMN" | <PLMN ID> |
| | "CSG" | <CSG ID> |

In some exemplary embodiments, attention (AT) commands (which may be defined in 3GPP TS defined 27.007) may be used as well to provide location information. The AT commands comprise a two character abbreviation used to start a command line to be sent from a terminal equipment to a terminal adapter. For example, an AT command may control (and/or provide location information) mobile termination (MT) functions through the terminal adaptor (TA). Moreover, these AT commands may be defined to include the location information described above (e.g., with respect to Table 1 and the like).

In some exemplary embodiments, reporting from the user equipment (e.g., one or more MDT reports and other like reporting related information) including the location information are received, at 230, by the network, such as the base station, the system simulator, and/or other network nodes. For example, the user equipment 114A may send MDT reports (which include MDT measurements and location information) to base station 110, which receives the reports and location information. The network may receive the MDT report including location information as well as other MDT reports and then analyze the MDT reports including the detailed location information included in the reports to assess the performance of the network. And, in some embodiments including the system simulator, the system simulator may receive one or more test messages including location information, which can be analyzed to assess whether the user equipment satisfies the conformance testing. Because the location information is provide to the user equipment, it is not required to have GPS processors or required to access those processors. Furthermore, in the case of the system simulator, it is not required to have GPS-based processors, as it can access location information from other nodes in the network.

Figure 3:
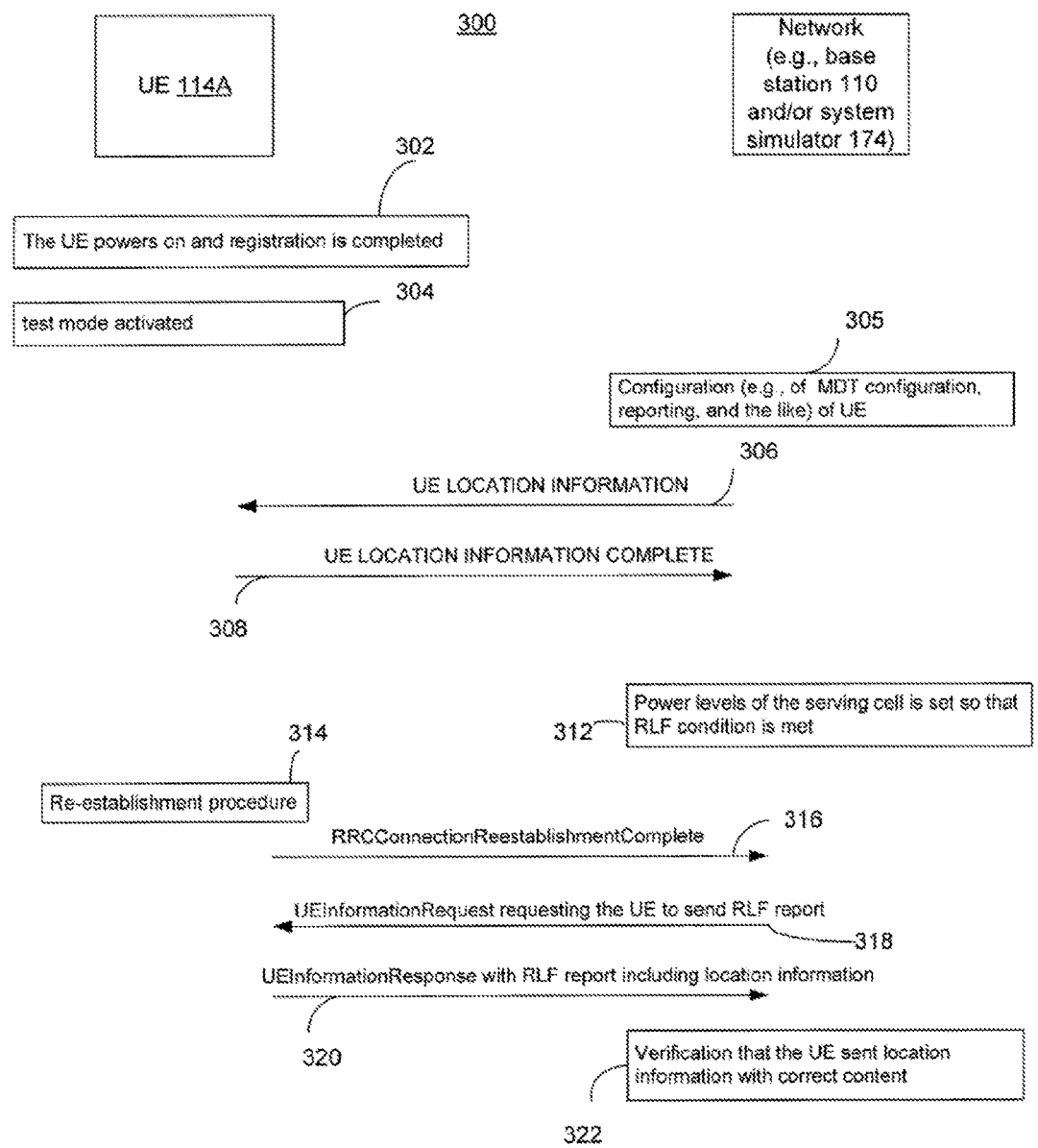
FIG. 3 depict another process in which the network provides the user equipment with location information to enable reporting including detailed location information, in accordance with some exemplary embodiments.

FIG. 3 depicts another process 300 for testing, in accordance with some exemplary embodiments.

In some exemplary embodiments, user equipment 114A may, at 302, power on and/or register with the network. In some exemplary embodiments, the registration is completed in accordance with 3GPP TS 36.508, although other procedures may be used as well.

In some exemplary embodiments, the test mode may be activated, at 304, so that the user equipment 114 and the network can perform testing, measurements, and reporting. In some exemplary embodiments, the activation is performed in accordance with 3GPP TS 38.508, although other procedures may be used as well.

In some exemplary embodiments, the network, at 305, may configure the user equipment to perform MDT. For example, the network may configure the user equipment to perform MDT reporting and the like.

In some exemplary embodiments, the network may, at 306, send a message to the user equipment 114A to provide location information, as described above with respect to 220. For example, base station 110 (and/or a system simulator 174) may, at 306, send to the user equipment 114A the location information (which represents the location of the UE) in a message, such as a RRC message or a test control (TC) message.

In some exemplary embodiments, the user equipment 114A may send, at 308, an acknowledgement message in response to message 306. For example, user equipment 114A may send, at 308, to the network a UE location information complete message to acknowledge that the location information was received at 306. The user equipment may include the location information provided by the network in messages and other information elements, such as MDT logs, measurement reports, and the like.

In some exemplary embodiments, the power levels of the serving cell, such as cell 112A, may be set, at 312, so that a radio link failure condition is met. For example, in implementations in which the system simulator 174 tests the user equipment 114A in a lab, the system simulator 174 may set radio conditions, such as power levels in the serving and new cell, but in the case of a non-lab environment, the radio conditions are dictated by the actual radio conditions and corresponding changes to those conditions (e.g. fast fading). At 314, the user equipment 114A may begin a reestablishment procedure with a new cell, such as cell 112B. Next, the user equipment 114A may indicate, at 316, in a message (e.g., a control plane signaling message, such as a RRC Connection Reestablishment Complete Message, and the like) that an event has occurred and thus radio link failure measurements, handover failure measurements, and any other measurements may be available at the user equipment 114A.

In some exemplary embodiments, the network may send, at 318, a control plane message to the user equipment 114A requesting a report including the measurements (e.g., MDT measurements and the like), such as radio link failure measurements and/or handover failure measurements as well as the location information. For example, base station 110 (and/or a system simulator 174) may send a UE Information Request message requesting that user equipment 114A provide a report, such a MDT report (e.g., a radio link failure report including the corresponding radio link failure measurements and location information), test message, and the like.

At 320, the user equipment 114A may send, in some exemplary embodiments, a control plane message in response to the request sent at 318. For example, the user equipment 114A may send to the network a report, such a MDT report, test message, and the like (e.g., a radio link failure report including the corresponding radio link failure measurements and/or a handover failure report including failure measurements) and location information (which corresponds to the location information provided at 306).

At 322, the network may verify that the user equipment 114A sent location information with correct location information. For example, the system simulator 174 may verify that user equipment is reporting correct location information IE linked to correct measurements, such as MDT measurements.

Figure 4:
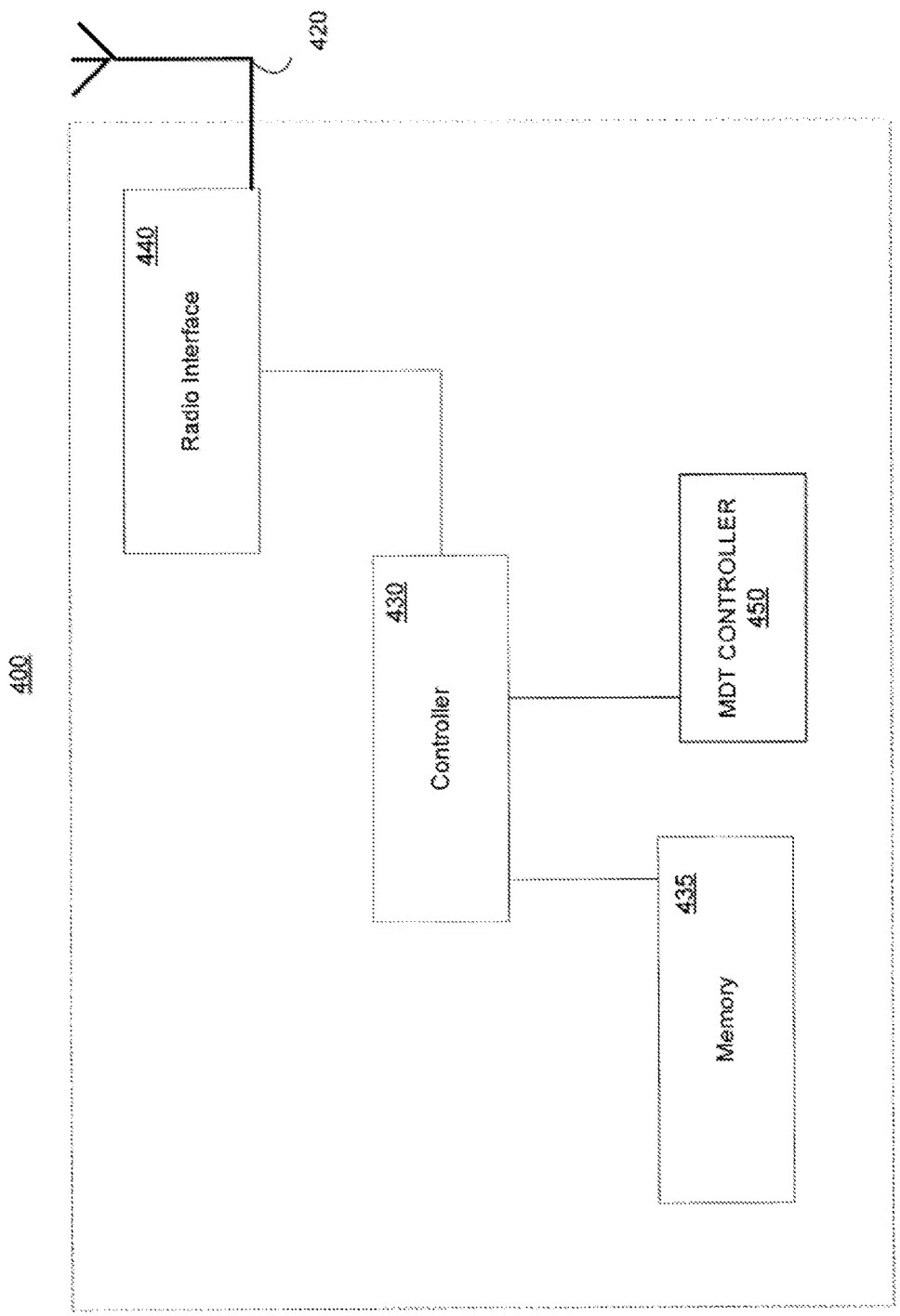
FIG. 4 depicts an example of a base station, in accordance with some exemplary embodiments.

FIG. 4 depicts an example implementation of a base station 400, which may be implemented at base station 110. The base station includes one or more antennas 420 configured to transmit via a downlink and configured to receive uplinks via the antenna(s) 420. The base station further includes a radio interface 440 coupled to the antenna 420, a processor 430 for controlling the base station 400 and for accessing and executing program code stored in memory 435. The radio interface 440 further includes other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). In some implementations, the base station is also compatible with IEEE 802.16, LTE, LTE-Advanced, and the like, and the RF signals of downlinks and uplinks are configured as an OFDMA signal. The base station may include an MDT controller 450. In some implementations, the MDT controller 450 performs one or more of the operations described herein with respect to a base station, such as an eNB, including one or more aspects of process 200 and/or process 300. Moreover, although the MDT controller 450 is depicted as part of base station 400, the MDT controller 450 may be implemented as a stand-alone node.

Figure 5:
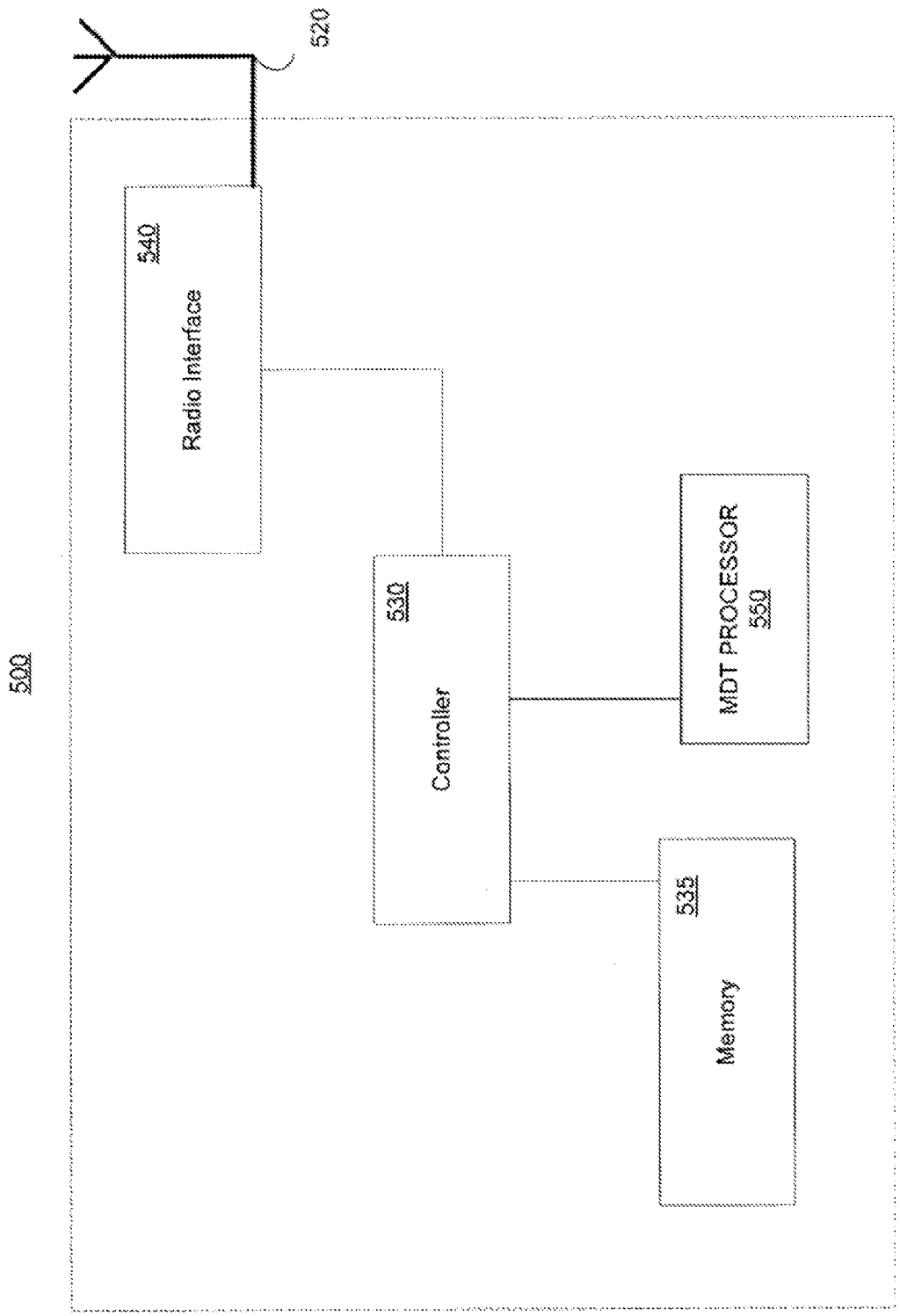
FIG. 5 depicts an example of user equipment, in accordance with some exemplary embodiments.

FIG. 5 depicts a block diagram of a radio, such as a user equipment 500. The user equipment 500 may include an antenna 520 for receiving a downlink and transmitting via an uplink. The user equipment 500 may also includes a radio interface 540, which may include other components, such as filters, converters (e.g., digital-to-analog converters and the like), symbol demappers, signal shaping components, an Inverse Fast Fourier Transform (IFFT) module, and the like, to process symbols, such as OFDMA symbols, carried by a downlink or an uplink. In some implementations, the user equipment 500 may also be compatible with WiFi, Bluetooth, GERAN, UTRAN, E-UTRAN, and/or other standards and specifications as well. The user equipment 500 may further include at least one processor, such as processor 520, for controlling user equipment 500 and for accessing and executing program code stored in memory 525. The user equipment may include an MDT processor 550. In some exemplary embodiments, the MDT processor 550 performs one or more of the operations described herein with respect to user equipment including one or more aspects of process 200 and/or process 300.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the examples described with respect to conformance testing (and the system simulator) may also be used in connection with MDT, and the examples described with respect to MDT may also be used with conformance testing (and the system simulator). Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   activating, at a user equipment, a testing mode to enable the user equipment to undergo conformance testing, wherein the conformance testing includes testing the user equipment for compliance with one or more wireless communication standards; and
   performing, at the user equipment, the conformance testing by at least:
   receiving, at the user equipment, location information provided by a network node, wherein the location information includes at least one of an ellipsoid point representative of a location, an ellipsoid point with altitude, a velocity, and a time of day, and wherein the location information is received in at least one of a radio resource control message, a test control message, a machine-to-machine interface message, or an attention command sent by the network node over an air interface;
   generating, by the user equipment, a report including at least one measurement and the location information linked to the at least one measurement; and
   sending, by the user equipment, the report to the network node, the report including the at least one measurement and the received location information, wherein the network node comprises a system simulator configured to perform the conformance testing of the user equipment.

2. The method of claim 1, wherein the at least one measurement is made by the user equipment to provide information for the report to enable the conformance testing.

3. The method of claim 1, wherein the location information further comprises an information element including the velocity associated with the user equipment making the at least one measurement, the time of day associated with the user equipment making the at least one measurement, and the ellipsoid point associated with the user equipment making the at least one measurement.

4. The method of claim 3, wherein the velocity represents a horizontal velocity.

5. The method of claim 1, wherein the location information is determined by the network node and sent to the user equipment rather than configuring location signaling at the user equipment to support the conformance testing.

6. The method of claim 1, wherein the location information is received, when a tracking area update is performed.

7. The method of claim 1, wherein the location information is received from a broadcast channel coupling the network node and the user equipment.

8. The method of claim 1, wherein the at least one measurement is useable to determine a compliance of the user equipment with at least one of a wireless standard or an operability of the user equipment within a network associated with the network node.

9. An apparatus comprising:
   a radio interface;
   at least one processor; and
   at least one memory including computer program code, the at least one memory and the computer program code configured to, with the at least one processor, cause the apparatus to perform at least the following:
   activate a testing mode to enable the apparatus to undergo conformance testing, wherein the conformance testing includes testing the apparatus for compliance with one or more wireless communication standards; and
   performing the conformance testing by at least:
   receiving, via the radio interface, location information representative of the location of the apparatus, the location information provided by a network node, wherein the location information includes at least one of an ellipsoid point representative of a location, an ellipsoid point with altitude, a velocity, and a time of day, and wherein the location information is received in at least one of a radio resource control message, a test control message, a machine-to-machine interface message, or an attention command sent by the network node over an air interface;
   generating a report including at least one measurement and the received location information linked to the at least one measurement; and
   sending, via the radio interface, the report to the network node, the report including the at least one measurement and the received location information, wherein the network node comprises a system simulator configured to perform the conformance testing of the apparatus.

10. The apparatus of claim 9, wherein the at least one measurement is made by the apparatus to provide information for the report to enable the conformance testing.

11. The apparatus of claim 9, wherein the location information further comprises an information element including the velocity associated with the apparatus making the at least one measurement, the time of day associated with the apparatus making the at least one measurement, and the ellipsoid point associated with the apparatus making the at least one measurement.

12. The apparatus of claim 11, wherein the velocity represents a horizontal velocity.

13. The apparatus of claim 9, wherein the location information is determined by the network node and sent to the apparatus rather than configuring location signaling at the apparatus to support the conformance testing.

14. The apparatus of claim 9, wherein the location information is received, when a tracking area update is performed.

15. The apparatus of claim 9, wherein the location information is received from a broadcast channel coupling the network node and the apparatus.

16. A non-transitory computer-readable medium encoded with instructions, which when executed by a computer, perform at least:
   activating, at a user equipment, a testing mode to enable the user equipment to undergo conformance testing, wherein the conformance testing includes testing the user equipment for compliance with one or more wireless communication standards; and
   performing, at the user equipment, the conformance testing by at least:
   receiving, at the user equipment, location information provided by a network node, wherein the location information includes at least one of an ellipsoid point representative of a location, an ellipsoid point with altitude, a velocity, and a time of day, and wherein the location information is received in at least one of a radio resource control message, a test control message, a machine-to-machine interface message, or an attention command sent by the network node over an air interface;
   generating, by the user equipment, a report including at least one measurement and the location information linked to the at least one measurement; and
   sending, by the user equipment, the report to the network node, the report including the at least one measurement and the received location information, wherein the network node comprises a system simulator configured to perform the conformance testing of the user equipment.

17. A method comprising:
   sending, by a network node, location information to a user equipment undergoing conformance testing, the location information representative of the location of the user equipment, the location information sent to enable the user equipment to participate in conformance testing, wherein the location information includes at least one of an ellipsoid point representative of a location, an ellipsoid point with altitude, a velocity, and a time of day, wherein the conformance testing includes testing the user equipment for compliance with one or more wireless communication standards, and wherein the location information is sent to the user equipment in at least one of a radio resource control message, a test control message, a machine-to-machine interface message, or an attention command sent by the network node over an air interface; and
   receiving, at the network node, the at least one measurement made at the user equipment, the at least one measurement linked to the location information representative of where the user equipment made the at least one measurement, wherein the network node comprises a system simulator configured to perform the conformance testing of the user equipment.

18. The method of claim 17, wherein the location information further comprises an information element including the velocity associated with the user equipment making the at least one measurement, the time of day associated with the user equipment making the at least one measurement, and the ellipsoid point associated with the user equipment making the at least one measurement.

19. The method of claim 18, wherein the velocity represents a horizontal velocity.

20. The method of claim 17, wherein the location information is determined by the network node and sent to the user equipment rather than configuring location signaling at the user equipment to support the conformance testing.

21. An apparatus comprising:
   a radio interface;
   at least one processor; and
   at least one memory including computer program code, the at least one memory and the computer program code configured to, with the at least one processor, cause the apparatus to at least the following:
   send, via the radio interface, location information to a user equipment undergoing conformance testing, the location information representative of the location of the user equipment, the location information sent to enable the user equipment to participate in conformance testing, wherein the location information includes at least one of an ellipsoid point representative of a location, an ellipsoid point with altitude, a velocity, and a time of day, wherein the conformance testing includes testing the user equipment for compliance with one or more wireless communication standards, and wherein the location information is sent to the user equipment in at least one of a radio resource control message, a test control message, a machine-to-machine interface message, or an attention command sent by the network node over an air interface; and
   receive, via the radio interface, the at least one measurement made at the user equipment, the at least one measurement linked to the location information representative of where the user equipment made the at least one measurement, wherein the apparatus comprises a system simulator configured to perform the conformance testing of the user equipment.

22. The apparatus of claim 21, wherein the location information further comprises an information element including the velocity associated with the user equipment making the at least one measurement, the time of day associated with the user equipment making the at least one measurement, and the ellipsoid point associated with the user equipment making the at least one measurement.

23. The apparatus of claim 22, wherein the velocity represents a horizontal velocity.

24. The apparatus of claim 21, wherein the location information is determined by the network node and sent to the user equipment rather than configuring location signaling at the user equipment to support the conformance testing.

25. A non-transitory computer-readable medium encoded with instructions, which when executed by a computer, perform at least:
   send, by a network node, location information to a user equipment undergoing conformance testing, the location information representative of the location of the user equipment, the location information sent to enable the user equipment to participate in conformance testing, wherein the location information includes at least one of an ellipsoid point representative of a location, an ellipsoid point with altitude, a velocity, and a time of day, wherein the conformance testing includes testing the user equipment for compliance with one or more wireless communication standards, and wherein the location information is sent to the user equipment in at least one of a radio resource control message, a test control message, a machine-to-machine interface message, or an attention command sent by the network node over an air interface; and receive the at least one measurement made at the user equipment, the at least one measurement linked to the location information representative of where the user equipment made the at least one measurement, wherein the network node comprises a system simulator configured to perform the conformance testing of the user equipment.

26. A method comprising:

activating, at a user equipment, a testing mode to enable the user equipment to undergo conformance testing, wherein the conformance testing includes testing the user equipment for compliance with one or more wireless communication standards; and performing, at the user equipment, the conformance testing by at least:

receiving, at the user equipment, location information to enable the user equipment to use the location information during the conformance testing without the user equipment having to access positioning circuitry at the user equipment, wherein the location information is provided by a network node, wherein the location information includes an ellipsoid point representative of at least one of a location or an ellipsoid point with altitude, wherein the network node comprises a system simulator configured to perform the conformance testing of the user equipment, and wherein the location information is received in at least one of a radio resource control message, a test control message, a machine-to-machine interface message, or an attention command sent by the network node over an air interface;

generating, by the user equipment, a report including at least one measurement performed by the user equipment and the location information linked to the at least one measurement; and sending, by the user equipment, the report to the network node to enable conformance testing of the user equipment, wherein the report includes the at least one measurement and the received location information.

* * * * *